(12) United States Patent
Jodet et al.

(10) Patent No.: US 10,894,594 B2
(45) Date of Patent: Jan. 19, 2021

(54) AIRCRAFT INCLUDING A WING WITH IMPROVED ACOUSTIC TREATMENT

(71) Applicant: SAFRAN AIRCRAFT ENGINES, Paris (FR)

(72) Inventors: Norman Bruno Andre Jodet, Maisons-Alfort (FR); Jean-Michel Boiteux, Coutencon (FR); Jacky Novi Mardjono, Nogent sur Marne (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 630 days.

(21) Appl. No.: 15/471,136

(22) Filed: Mar. 28, 2017

(65) Prior Publication Data

US 2017/0283032 A1 Oct. 5, 2017

(30) Foreign Application Priority Data

Mar. 30, 2016 (FR) ..................... 16 52727

(51) Int. Cl.
*B64C 3/26* (2006.01)
*F02K 1/34* (2006.01)
*B64D 27/18* (2006.01)
*B64D 29/02* (2006.01)

(52) U.S. Cl.
CPC ............... *B64C 3/26* (2013.01); *B64D 27/18* (2013.01); *B64D 29/02* (2013.01); *B64D 33/06* (2013.01)

(58) Field of Classification Search
CPC .......... B64C 3/26; B64D 29/02; B64D 27/18; B64D 33/06
See application file for complete search history.

(56) References Cited

U.S. PATENT DOCUMENTS

| 7,341,225 B2 * | 3/2008 | Stretton | B64D 29/02 244/54 |
|---|---|---|---|
| 2005/0011988 A1 * | 1/2005 | Stretton | B64D 29/02 244/1 N |
| 2009/0152400 A1 | 6/2009 | Verde Preckler et al. | |

(Continued)

FOREIGN PATENT DOCUMENTS

| EP | 1 493 665 A1 | 1/2005 |
|---|---|---|
| FR | 2 938 014 A1 | 5/2010 |

(Continued)

OTHER PUBLICATIONS

Search Report dated Sep. 20, 2017 in United Kingdom Patent Application No. GB1705038.6.

(Continued)

*Primary Examiner* — Valentina Xavier
(74) *Attorney, Agent, or Firm* — Oblon, McClelland, Maier & Neustadt, L.L.P.

(57) ABSTRACT

An aircraft including a wing and an aeroengine having a longitudinal main axis and including a ducted nacelle with at least one fan is disclosed. The wing includes an acoustic treatment surface on a bottom portion of its outer shell on either side of the longitudinal main axis and over a width perpendicular to the longitudinal main axis that is not greater than three times the diameter of the fan. The acoustic treatment surface includes a layer of porous material for attenuating acoustic waves coming from the fan.

9 Claims, 2 Drawing Sheets

(56) References Cited

U.S. PATENT DOCUMENTS

| | | | | |
|---|---|---|---|---|
| 2013/0009002 A1* | 1/2013 | Aeberli | ............... | B64D 29/02 |
| | | | | 244/1 N |
| 2013/0043343 A1* | 2/2013 | Vuillemin | ............... | B64C 1/40 |
| | | | | 244/1 N |
| 2015/0267644 A1* | 9/2015 | Cerra | ............... | B23P 15/008 |
| | | | | 239/265.11 |
| 2017/0001708 A1 | 1/2017 | Alonso-Miralles et al. | | |

FOREIGN PATENT DOCUMENTS

| | | |
|---|---|---|
| FR | 2 942 202 A1 | 8/2010 |
| FR | 2 959 342 A1 | 10/2011 |

OTHER PUBLICATIONS

French Preliminary Search Report dated Oct. 12, 2016 in French Application 16 52727 filed on Mar. 30, 2016 (with English Translation of Categories of Cited Documents).

* cited by examiner

AIRCRAFT INCLUDING A WING WITH IMPROVED ACOUSTIC TREATMENT

BACKGROUND OF THE INVENTION

The present invention relates to the field of aviation and applies more particularly to the fan noise and/or jet noise radiated by aircraft having a large bypass ratio (BPR>8) or a very large bypass ratio (BPR>12) and fitted in particular with a ducted turbofan.

Unfortunately, in such architectures, fan casings (and the associated nacelles) are usually very short with a bypass stream that is short (lying in the range half a diameter to two diameters of the fan), the fan being close to the leading edge of the wing and downstream therefrom in order to minimize the aerodynamic losses generated by air friction on the surface of the nacelle, by taking advantage of the air stream slowing phenomenon as illustrated for example in patent application US 2013/0020433. In that type of engine, characterized by a ratio between the length of the nacelle and a maximum fan blade chord lying in the range 2.5 to 7.5, the speed at which the bypass stream is ejected compared with conventional architectures is small, and the propagation of noise generated by the fan and by its interaction with the adjacent outlet guide vanes (OGV), in particular resulting from waves being reflected on the wing of the aircraft, is found to be particularly significant and preponderant in particular over jet noise, and of a nature to give rise to a particularly large amount of ground noise, in particular during stages of the aircraft taking off and landing.

OBJECT AND SUMMARY OF THE INVENTION

The present invention thus has a main object of proposing a solution for significantly attenuating the noise radiated by the fan of an aeroengine having a large bypass ratio.

This object is achieved by an aircraft having a wing and an aeroengine with a longitudinal main axis M and including a ducted nacelle containing at least one fan, the aircraft being characterized in that the wing includes an acoustic treatment surface on a bottom portion of its outer shell on either side of said longitudinal main axis M and over a width L perpendicular to said longitudinal main axis M that is no greater than three times the diameter D of said fan, the acoustic treatment surface comprising a layer of porous material for attenuating acoustic waves coming from said fan.

Thus, by absorbing the reflecting acoustic waves, the fan noise and/or the jet noise perceived during stages of the airplane taking off and landing is significantly attenuated.

Advantageously, said ducted nacelle also includes outlet guide vanes and said acoustic treatment surface is also for attenuating the noise generated by interaction between said fan and said outlet guide vanes.

Preferably, said porous material is of the ceramic foam or honeycomb type.

Advantageously, said acoustic treatment surface excludes predetermined zones for attaching said engine and for attaching flaps.

Preferably, said acoustic treatment surface is centered on said longitudinal main axis M and flares going from a leading edge towards a trailing edge of the wing.

Advantageously, said width L lies in the range 0.5D to 2D and a maximum width L is given by the following formula:

$$L = 2D/\tan(\alpha)$$

with:

D, the diameter of the fan; and

α, the propagation direction of the acoustic waves.

Preferably, said angle α is less than 35°, and typically lies in the range 33° to 34°.

In an advantageous embodiment, said acoustic treatment surface is formed by at least one acoustic panel defined axially firstly at a downstream end positioned as close as possible to a trailing edge of the wing, and secondly to an upstream end coinciding with an ejection plane P of said ducted nacelle, while possibly exceeding its width. Preferably, said acoustic treatment surface is formed by at least one acoustic panel in the shape of a trapezoid that is symmetrical about said longitudinal main axis M, of width that flares going from said leading edge to said trailing edge, and having a small base that is arranged in an ejection plane P coinciding with a downstream end of said ducted nacelle in an ejection plane P of said nacelle. It is possible to arrange additional panels upstream from said ejection plane P.

The invention also provides an aircraft including a turbojet having a bypass ratio greater than 8 and preferably greater than 12.

BRIEF DESCRIPTION OF THE DRAWINGS

Other characteristics and advantages of the present invention appear from the following description given with reference to the accompanying drawings, which show an embodiment having no limiting character, and in which.

DETAILED DESCRIPTION OF AN EMBODIMENT

Figure 1:
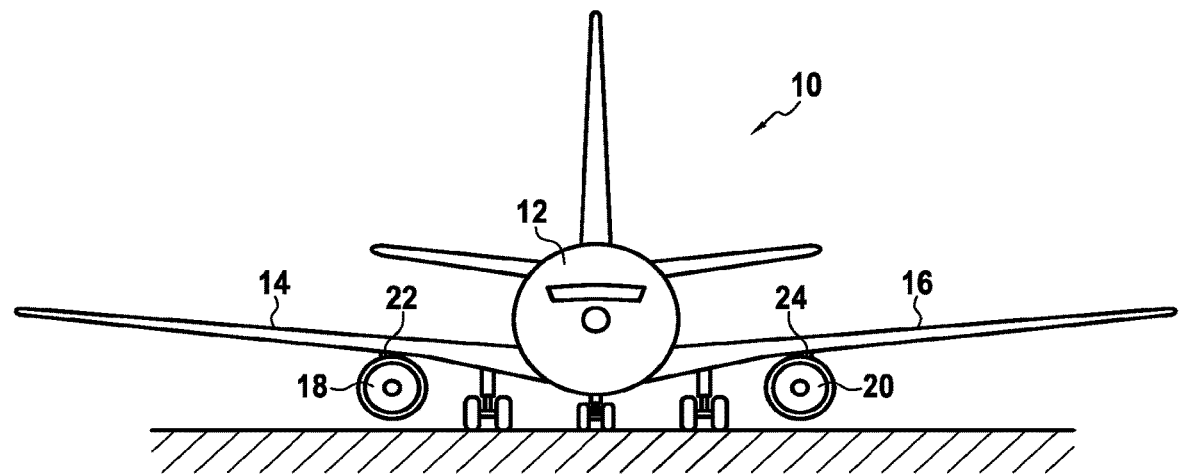
FIG. 1 is a diagrammatic front view of an airplane on the ground having an improved wing of the invention.

FIG. 1 is a diagrammatic front view of an aircraft 10 having a fuselage 12 that is extended laterally by two wings 14 and 16. A respective aeroengine 18, 20 is mounted under each of these wings and is connected to the wing by conventional attachment means of the single-axis pylon or mast type 22, 24. Naturally, the invention is not limited to this twin-engine configuration, but is also applicable to a four-engine configuration, or to any other configuration, providing at least one engine is arranged under a wing. Likewise, as shown in patent FR 2 622 507, it is also possible to envisage that the aeroengine is connected to the wing by a fan casing directly incorporated in the wing via an attachment system that is not concentrated on a single axis but rather that is a "multipoint" attachment system.

Figure 2:
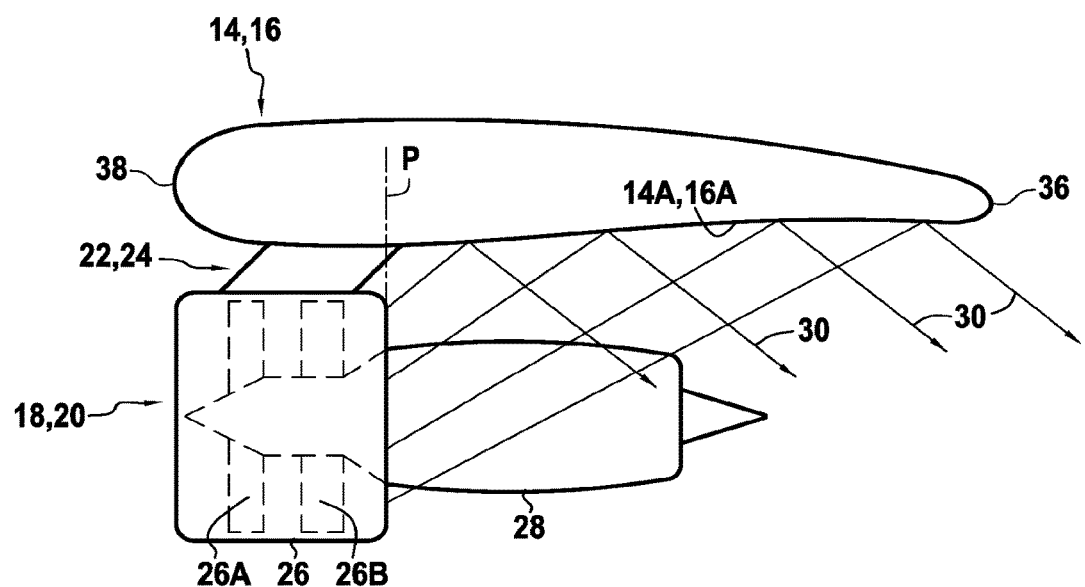
FIG. 2 is a side view of an aeroengine arranged under the wing of an airplane.

FIG. 2 shows more precisely how the aeroengine 18, 20 is attached under the wing 14, 16 of the aircraft by means of the pylon or mast 22, 24. The aeroengine is preferably an engine having a large bypass ratio (e.g. BPR>8) and that possesses a ducted nacelle 26 that is short, i.e. in which the length of the fan(s) 26A plus the OGVs 26B is considerably shorter than the length of the gas generator 28. With this type of short nacelle engine, the acoustic waves 30 given off by the fan 26A and reflected by the wing, more precisely by the bottom surface 14A, 16A of its outer shell, generates large amounts of low frequency noise on the ground (which noise corresponds to interaction between the fan and the OGVs), in particular during stages of the aircraft taking off and landing, which can reach 120 decibels (dB) to 140 dB, and which it is therefore important to reduce as much as possible.

The invention thus consists in optimally integrating acoustic treatment under the wing of the aircraft for absorbing a portion of the incident acoustic waves combined with optimized dimensioning based on the dimensions of the engine. Any type of treatment can be envisaged provided it makes it possible to absorb a portion of the incident acoustic waves (mention may be in particular of treatment based on porous materials of the honeycomb or ceramic foam type, which materials are in the most widespread use) and provided it makes it possible to reconstitute the profile of the wing as well as possible, since the treatment surface then corresponds to the surface of the wing.

As an example of honeycomb type porous material, reference may be made for example to patent FR 2 965 859 filed in the name of the Applicant, which discloses an acoustic treatment panel having at least one honeycomb structure core that is sandwiched between a solid skin and a perforated skin, the central portion and the end portions of the panel possibly having one or two layers.

Figure 3:
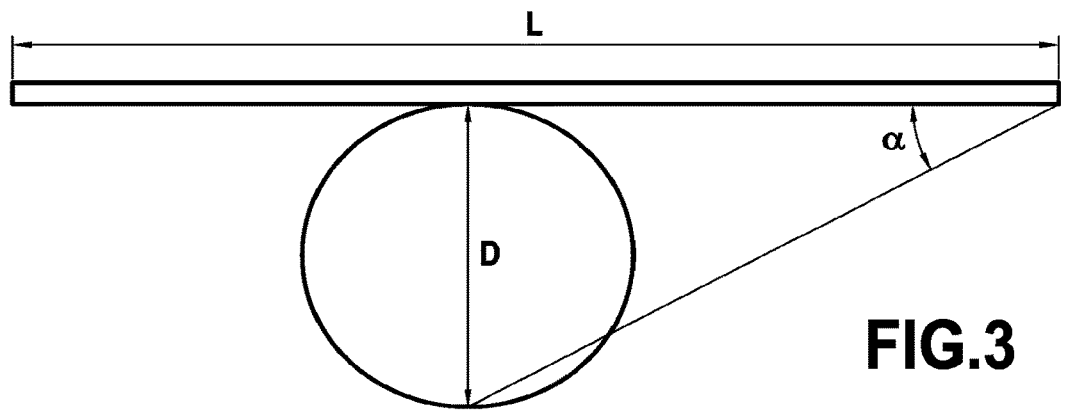
FIG. 3 shows the transverse dimensioning of the acoustic treatment surface of the improved wing of the invention.

FIG. 3 shows the dimensioning of the width L of the wing surface 32 that is to receive the acoustic treatment for a given diameter D of the fan, that serves to maximize attenuation of acoustic waves. For this purpose, a wave propagation direction angle α is defined beyond which the acoustic radiation is judged to be sufficiently attenuated to limit its impact on the ground. Various measurement campaigns carried out by the inventors have made it possible to determine that an angle α that is slightly smaller than 35°, typically lying in the range 33° to 34°, represents the best compromise. At less than 33°, the treated area is of less advantage since the waves are damped sufficiently as a result of passing through air.

Thus, the maximum width L of the surface enabling a maximum amount of acoustic radiation to be attenuated is given by:

$$L = 2D/\tan(\alpha)$$

with:
D, the diameter of the fan; and
α, the propagation direction of the acoustic waves.

In a configuration in which it is desired to improve the compactness of the device, it is possible to envisage reducing the area of the acoustic treatment surface in order to avoid taking account of lateral radiation. Thus, the maximum width is preferably given by the following formula:

$$0.5D < L < 3D$$

and more preferably by:

$$D < L < 2D$$

Below, 0.5D, the acoustic effect is very insufficient and above 3D, the acoustic effect is negligible. It should be observed that the high threshold can nevertheless be reduced to 2D, depending on the shape of the wing of the aircraft.

Preferably, the acoustic treatment surface 32 is centered on the main longitudinal axis M of the engine, corresponding to the axis of rotation of the fan, or when there is a plurality of fans having parallel axes of rotation, corresponding to the middle axis between those parallel axes of rotation.

Figure 4:
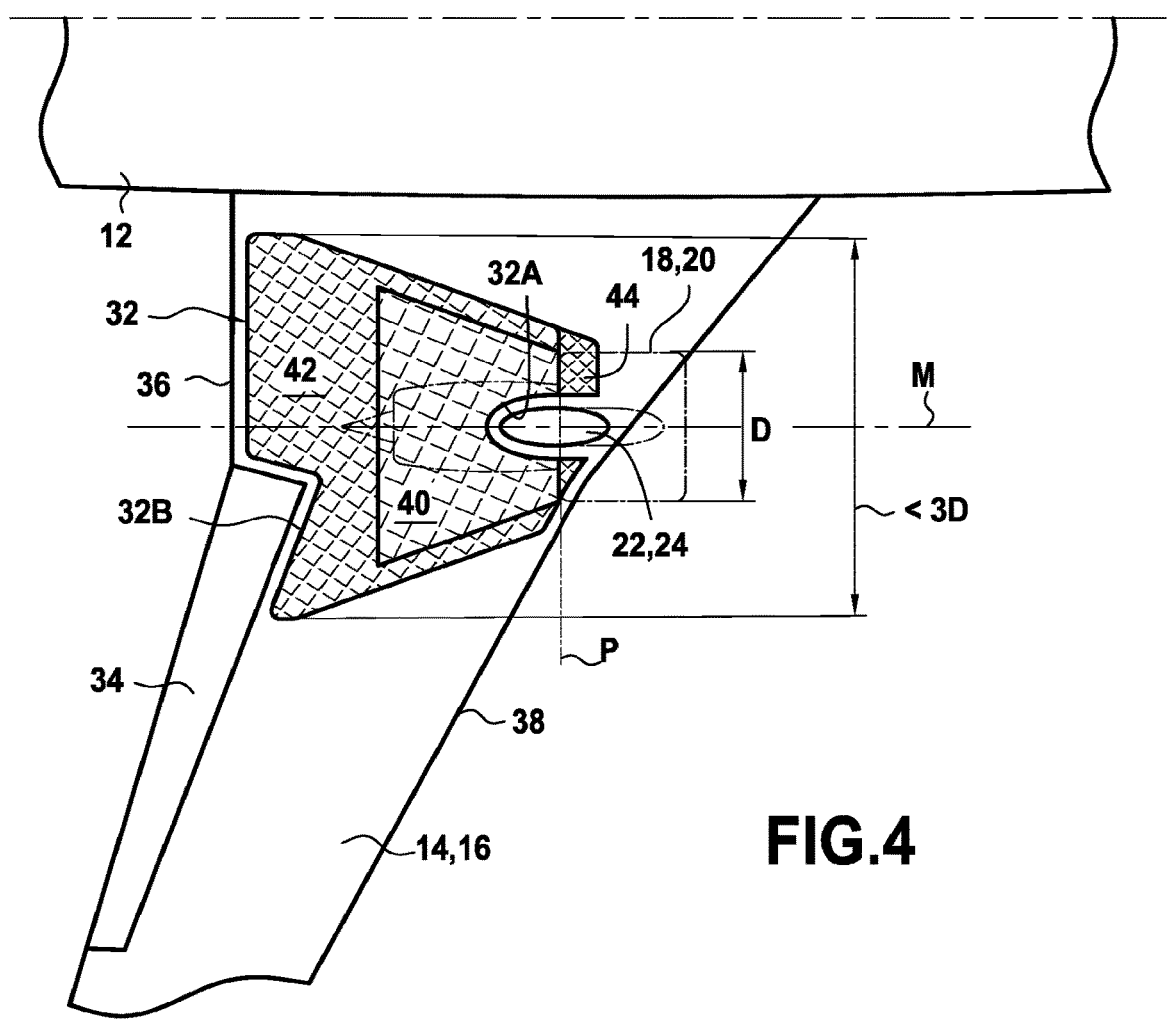
FIG. 4 shows an example of positioning the acoustic treatment surface of the invention under the wing of an airplane.

However, as shown in FIG. 4, it is naturally possible to envisage truncating this surface on one side and/or the other in order to achieve a better compromise taking account of constraints associated with integration (associated with the presence of flaps 34 and associated with available space) and associated with performance constraints (potential aerodynamic penalty caused by the surface state of the treatment). For the same integration constraints, the acoustic treatment surface is also defined axially at its downstream end that should be positioned as close as possible to the downstream end of the wing (trailing edge 36). In contrast, the upstream end of the treated surface advantageously coincides with the ejection plane P of the nacelle 26 of the aeroengine.

This acoustic treatment surface is formed by at least one acoustic panel of width that becomes wider on going axially from the leading edge 38 towards the trailing edge 36, so as to reach a maximum width L no greater than 3D. Preferably, the panel forms an (isosceles) trapezoid 40 that is symmetrical about the main axis, having its small base located in the ejection plane P of the nacelle. Depending on the desired acoustic damping conditions, the base of the panel may be greater than the width of the nacelle, and the panel 42 as formed in this way may extend its surface as far as the trailing edge 36. Finally, one or more additional panels 44 may be arranged upstream from the ejection plane P in order to provide better coverage around the ejection, but nevertheless without going all the way to the leading edge 38 of the wing.

Thus, reference 32A designates a gap for passing the engine-supporting mast 22, 24 of the aircraft, and reference 32B designates a gap for passing the flaps of the wing 14, 16.

The invention thus proposes an effective solution for countering the problems of fan and/or jet noise raised by architectures having ducted nacelles that are short.

Experimentation has demonstrated a potential improvement of about 2 dB for the configurations that were tested, which amounts to halving the noise, which is considerable.

The invention claimed is:

1. An aircraft comprising:
a wing; and
an aeroengine with a longitudinal main axis and including a ducted nacelle containing a fan,
wherein for attenuating acoustic waves coming from said fan, the wing includes an acoustic treatment surface on a bottom portion of an outer shell of the wing on either side of said longitudinal main axis and over a width perpendicular to said longitudinal main axis that is no greater than three times a diameter of said fan, the acoustic treatment surface comprising a layer of porous material that reconstitutes an aerodynamic profile of the wing, and
wherein said width lies in a range of one-half times the diameter of the fan to two times the diameter of the fan, and a maximum width L is given by the following formula:

$$L = 2D/\tan(\alpha)$$

with:
D being the diameter of the fan; and
α being an acoustic wave propagation angle lying in a range of 33° to 34°.

2. The aircraft according to claim 1, wherein said ducted nacelle further includes outlet guide vanes and said acoustic treatment surface attenuates noise generated by interaction between said fan and said outlet guide vanes.

3. The aircraft according to claim 1, wherein said porous material includes ceramic foam or honeycomb.

4. The aircraft according to claim 1, wherein said acoustic treatment surface excludes predetermined zones for attaching said engine and for attaching flaps.

5. The aircraft according to claim 1, wherein said acoustic treatment surface is centered on said longitudinal main axis and flares going from a leading edge towards a trailing edge of the wing.

6. The aircraft according to claim 5, wherein said acoustic treatment surface is formed by at least one acoustic panel presenting a shape of a trapezoid that is symmetrical about said longitudinal main axis, of width that flares going from said leading edge to said trailing edge of the wing, and having a small base that is arranged in an ejection plane coinciding with a downstream end of said ducted nacelle.

7. The aircraft according to claim 1, wherein said acoustic treatment surface is formed by at least one acoustic panel defined axially firstly at a downstream end positioned as close as possible to a trailing edge of the wing, and secondly to an upstream end coinciding with an ejection plane of said ducted nacelle.

8. The aircraft according to claim 1, including a turbojet having a bypass ratio greater than 8.

9. The aircraft according to claim 8, wherein the bypass ratio of the turbojet is greater than 12.

* * * * *